Jan. 30, 1940.　　　　F. R. F. RAMSAY　　　　2,188,845
MEANS FOR TESTING THE ELECTRICAL IGNITION
SYSTEMS OF INTERNAL COMBUSTION ENGINES
Filed April 6, 1938

INVENTOR
F.R.F. RAMSAY.
BY
ATTORNEYS

UNITED STATES PATENT OFFICE 2,188,845

MEANS FOR TESTING THE ELECTRICAL IGNITION SYSTEMS OF INTERNAL COMBUSTION ENGINES

Frank Raymond Faber Ramsay, London, England, assignor to D. Napier & Son Limited, London, England, a company of Great Britain Application April 6, 1938, Serial No. 200,548
In Great Britain April 10, 1937

13 Claims. (Cl. 175—183)

This invention relates to means for testing the ignition systems of internal combustion engines employing spark ignition, and one object of the invention is to provide improved means for checking the operation of the ignition system of an internal combustion engine and more especially for detecting faulty sparking plugs or determining the condition of such plugs. The invention finds a particularly useful application in connection with aircraft having several multi-cylinder engines with shielded dual ignition, but may also be used in connection with ordinary motor cars having a simpler engine with a single ignition apparatus.

According to one feature of the present invention an electric indicating device such for example as a telephone receiver is coupled to the ignition apparatus so as to receive impulses corresponding to those delivered to the sparking plugs, means being provided for progressively reducing the intensity of the impulses delivered to the sparking plugs. The receiver may be coupled to either the primary or the secondary winding of the ignition system. The means for reducing the intensity of the impulses may for example comprise a variable resistance connected in a circuit shunted across the primary winding of the ignition apparatus or across the sparking plug points.

It is found that when a pair of headphones is connected in parallel with the contact-breaker of a magneto, a missing spark due to an open circuit or partial short circuit is audible as a sharp crackle which is easily differentiated from the comparatively regular hum or coarse buzz caused by normal regular sparking. A failure to spark due to a complete short circuit also becomes audible as an interruption or unevenness in the normal buzz, and is also distinguishable from regular sparking though less clearly than in the case of a failure to spark due to an open circuit. By progressively reducing the intensity of the impulses delivered to the sparking plugs the latter can be successively made to fail to spark in this manner, and it is thus possible to obtain a comparative indication of the condition of a number of plugs which are none the less in sufficiently good order to give a spark in normal operation, and therefore to judge approximately how soon renewal or adjustment of the plugs is likely to be necessary.

Conveniently the indicating device is coupled to the ignition apparatus by means of a transformer.

Figure 1:
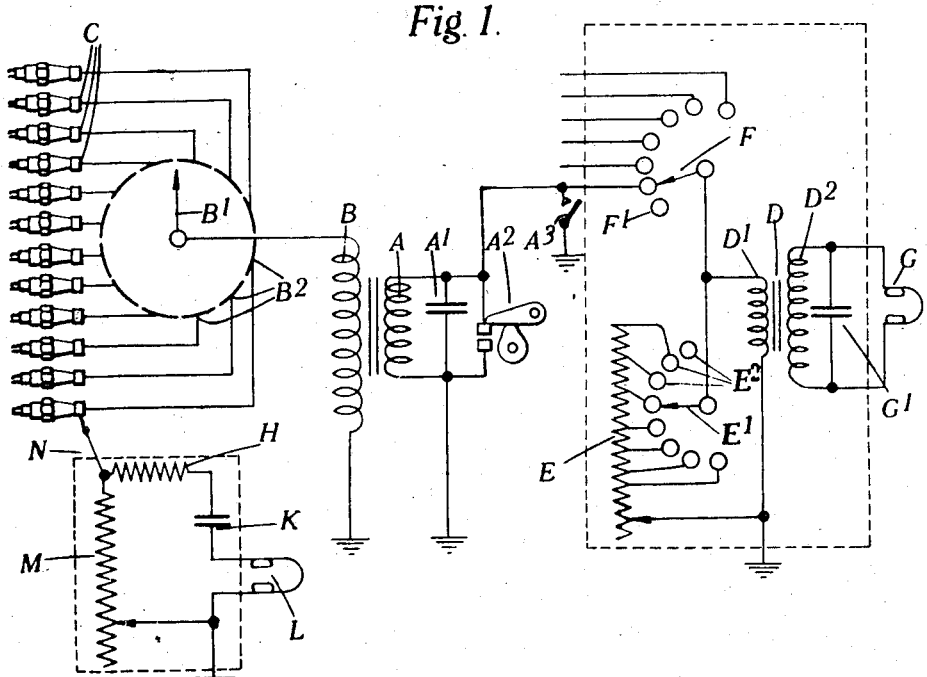
Figures 2, 3:
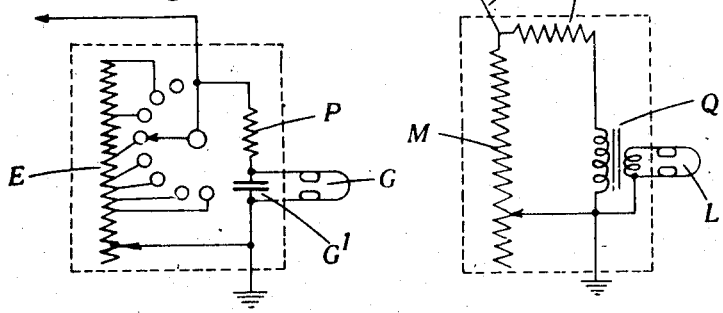
Figure 4:
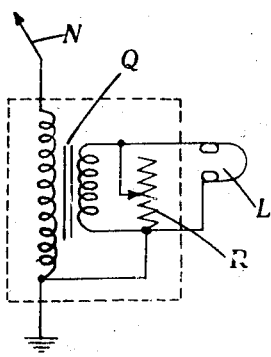

Further objects of the invention will be apparent from the following description of certain specific embodiments, by way of example with reference to the accompanying drawing, in which Figure 1 is a circuit diagram of one form of testing apparatus according to the invention applied to a magneto ignition system, Figure 2 is a diagram of a modified form of testing apparatus, and Figures 3 and 4 are diagrams of further forms of testing apparatus which may be employed independently or in substitution for a part of the apparatus shown in Figure 1.

The arrangement shown in Figure 1 is suitable for permanent installation in a machine such as an aircraft having three engines, each with a multi-cylinder dual ignition system. Only one ignition system, of the magneto type, is shown connected to the testing apparatus.

The magneto of this system is shown as having a primary winding A and a secondary winding B, the primary winding being connected in parallel with the usual condenser $A^1$, contact-breaker $A^2$ and earthing switch $A^3$ for stopping the engine. The secondary winding is connected between earth and the distributor arm $B^1$ which distributes the current to a number of segments $B^2$ connected to sparking plugs C.

The testing apparatus comprises a transformer D having its primary winding $D^1$ shunted by a variable resistance E and connected between an earth connection and the arm of a selector switch F. Each of the studs $F^1$ of the latter is connected to the unearthed end of the primary winding of one of the magnetos so that the testing apparatus can be connected to each magneto in turn by moving the selector switch F, a blank stud being provided at the end to disconnect the testing apparatus from the ignition systems. For example where each magneto has a lead brought to an ignition switch, such as the switch $A^3$, within reach of the pilot, the studs $F^1$ may be connected to such leads, the testing apparatus being also within reach of the pilot and accessible for use when in flight.

The secondary winding $D^2$ of the transformer D is connected to a pair of headphones G shunted by a condenser $G^1$ constituting a filter to reduce higher harmonics. The transformer D may have a step-up ratio in order to increase the sound audible in the telephones.

The primary winding of the transformer D has a high impedance so that when the variable resistance E is set to its maximum value, the device has little or no effect on the operation of the ignition system. If, however, one of the sparking plugs is faulty or has such an excessive gap that it fails to spark, a sharp crackle will be heard in the headphones which can be easily differentiated from the regular hum caused by normal sparking.

As the value of the variable resistance E is reduced the intensity of the impulses delivered to the sparking plugs will be progressively reduced. The resistance E is arranged so that when it is in its minimum-resistance position the secondary voltage of the magneto is reduced to a value just sufficient to produce a spark plug at a sound plug. Thus as the resistance E is gradually reduced faulty plugs will successively fail to spark, a corresponding crackle being heard superimposed on the steady hum or buzz previously audible. The variation of the resistance E is preferably effected by employing a selector switch E¹ with studs E² connected to a number of tappings on a resistance coil. These tappings may be graduated in accordance with a curve connecting the voltage output of an average magneto with the resistance shunted across the primary and arranged to give an approximately equal voltage drop for each step, in which case the steps will increase from a minimum. For example, in one specific case the minimum resistance is 30 ohms from which the first three steps increase the resistance by 2 ohms, successive steps increasing until the last three steps increase it by 50, 100 and 200 ohms respectively. A final stud is provided which opens the shunt resistance circuit.

Preferably the minimum resistance is adjustable, by means of a separate control, to enable it to be set appropriately for different magnetos. For example the first section of the resistance E may be constituted by a simple wire wound rheostat with a semi-accessible control such as a screwdriver slot in the spindle instead of the usual knob, to avoid accidental variation of its value.

Thus, by noting the position of the resistance selector arm E¹ when each plug fails, it is possible to estimate roughly the voltage required to cause that plug to spark, and obtain an idea of the useful running time available from that plug before it will require attention.

A plug which is partially short-circuited, due to a fouled insulator, is found to give a similar indication to a plug which is open-circuited or has an excessive gap. Whilst the invention is not dependent on any theory as to the reason for this, it is believed that in normal operation the occurrence of a spark plug causes a rapid drop in the impedance across the secondary side of the magneto whereas a failure to spark, whether due to an excessive gap or a slight leakage which prevents the voltage from rising to the necessary value, results in the high voltage persisting for a longer period and thus causes the sharp crack heard in the headphones.

In the case of a plug which is substantially completely short-circuited, an indication is conveniently obtained with the resistance switch set to its end stud corresponding to infinite resistance. In this case the coarse buzz obtained when all the plugs are firing satisfactorily will be interrupted or uneven.

Alternatively or in addition to the apparatus described as being connected to the primary side of the magneto, there may be provided testing apparatus connected to its secondary side. Thus, where access can be had to the sparking plug terminals or points electrically connected to them, a testing unit comprising a resistance H in series with a condenser K and a pair of headphones L may be employed. This circuit is adapted to be connected across the sparking plug points, for example by connecting the headphones to earth and the resistance by a lead N to each sparking plug in turn or to the segments of the distributor if these are more readily accessible. Again, for initially detecting in a rapid manner whether any of the sparking plugs are faulty, the circuit may be connected directly across the secondary winding B of the magneto instead of through the distributor. A faulty plug will then produce a discontinuity in the regular buzz of normal operation heard in the headphones.

The resistance H may, for example, be about a megohm whilst the condenser K may be 100 microfarads, these components providing on the one hand a smoothing circuit and on the other hand a protection for the headphones from the high voltage between the sparking plug terminal and earth. The apparatus described may be applied to each sparking plug in turn to determine whether that particular plug is functioning satisfactorily or not.

The testing circuit H, K, L may be shunted by a variable resistance M for progressively reducing the intensity of the impulses delivered to the sparking plug. This may be in the form of a resistance tapped by means of a selector switch, the construction being such as to be suitable with the high voltages applied to the sparking plugs.

The testing apparatus on the secondary side of the magneto may be provided alone without that provided on the primary side, or it may be provided in addition to the testing apparatus on the primary side or a portion thereof. For example, the testing circuit on the secondary side may be provided as shown in conjunction with the variable resistance E on the primary side for progressively reducing the intensity of the impulses delivered to the sparking plugs but without the transformer D and associated headphones F and condenser G. Again, a testing circuit may be provide which is adapted to be connected either to the primary or to the secondary side of the magneto.

When only the testing apparatus on the primary side is provided, it may be possible, in the case of an appropriate engine, to determine which plug is faulty by adjusting the apparatus to make the faulty plug misfire and switching off one of the magnetos completely, leaving the magneto with the faulty plug running the engine. The drop in temperature of the cylinder concerned then indicates which is the faulty plug.

Figure 2 shows a simplified form of the testing apparatus on the primary side of the magneto. In this case the transformer D and the selector switch F are omitted and a resistance P cooperates with the condenser G¹ as a filter. In other respects the arrangement of Figure 2 is similar to that of Figure 1. This arrangement is suitable for incorporation in a portable device which may be employed for testing engines such, for example, as ordinary motor car engines, by taking one lead from the testing device to a part of the frame of the engine and the other lead to a part of the unearthed switch lead from the magneto or ignition coil. The operation is the same as that of the corresponding part of the arrangement of Figure 1.

With regard to the values of the components employed, these will vary in accordance with the circumstances, but it may be mentioned that in the arrangement of Figure 2 the series resistance P of the filter circuit is 50,000 ohms whilst the condenser G¹ is of .2 microfarads. The resistance E has a minimum value of 30 ohms and a maximum value (apart from the infinite position) of 500 ohms, the steps being graduated from 2 ohms each up to 200 ohms as mentioned above.

In the circuit shown on the secondary side of the magneto in Figure 1 for testing individual plugs, the series resistance H is of 500,000 ohms whilst the series capacity K is of 300 micro-microfarads, but considerable variation is possible in these values. In each case a normal pair of headphones is employed.

Figures 3 and 4 show alternative arrangements of the testing circuit for the secondary side of the magneto. Thus, in Figure 3 the arrangement is the same as that of Figure 1 except that the headphones L are coupled to the circuit through a step-down transformer Q and the condenser K is omitted. In Figure 4 the primary of the step-down transformer is directly connected between the sparking plug lead N and the earth lead, and variation of the impulses delivered to the plug is obtained by a variable resistance R shunted across the secondary of the transformer in parallel with the headphones.

It will be appreciated that the invention is not limited to the patricular arrangements described by way of example. Thus, the variable resistance E may be connected in series with the headphones or with the primary winding of the transformer D which may then be of comparatively low impedance. A tapped transformer may in some cases be desirable to vary the volume of sound whilst amplifiers and filter circuits can be used to render the detection clearer. Other forms of indicator may moreover be substituted for the telephone receiver, for example a neon tube. Such a tube may be substituted for the telephone receiver G on the primary side, being connected directly to the secondary winding of the step-up transformer D. Alternatively a neon tube may be connected in series or in parallel with the sparking plug points of each plug in turn or a number of tubes may be provided one for each plug.

The invention may be installed as a permanent part of the ignition equipment of an engine so as to be capable of being brought into circuit by a switch or a plug for example on the instrument board of an aircraft or other vehicle, as indicated in the arrangement of Figure 1, or it may be made as a portable unit adapted to be connected to the appropriate terminals for example by a plug when the ignition apparatus of an engine is to be tested thereby.

By the term "high speed indicating device" appearing in the following claims is meant a device which has a very rapid response to impulses delivered to it. With a device of this kind such as a telephone receiver, thermionic device, gas discharge tube or the like, failure of a single plug is clearly indicated by a perceptible discontinuity in the steady flow of indications.

It will be appreciated that the invention provides a particularly efficient and convenient method of testing for faulty ignition. Owing to the complete shielding used on most aero-engine ignition systems, normal methods of testing plugs such as removing a lead or short-circuiting the plug, are often impossible. By means of the present invention it is a comparatively simple matter to discover whether any plugs are faulty and also to assess the running time which will elapse before the plugs are likely to become faulty due to electrode erosion or fouling of the plug insulator.

What I claim as my invention and desire to secure by Letters Patent is:

1. Apparatus for testing ignition systems of internal combustion engines comprising a telephone receiver, means whereby the telephone receiver can be coupled to the ignition apparatus so as to receive impulses and give indications corresponding to the impulses delivered to the sparking plugs, and means for progressively reducing the intensity of the latter impulses.

2. Apparatus for testing the ignition systems of internal combustion engines comprising a telephone receiver, means whereby the telephone receiver can be coupled to the primary winding of the ignition apparatus so as to receive impulses and give indications corresponding to the impulses delivered to the sparking plugs, and means for progressively reducing the intensity of the latter impulses.

3. Apparatus for testing ignition systems of internal combustion engines comprising a telephone receiver, means whereby the telephone receiver can be coupled to the ignition apparatus so as to receive impulses and give indications corresponding to the impulses delivered to the sparking plugs, and a variable resistance connected in a circuit shunted across the primary winding of the ignition apparatus for progressively reducing the intensity of the impulses delivered to the sparking plugs.

4. Apparatus for testing the ignition systems of internal combustion engines comprising a telephone receiver, means whereby the telephone receiver can be coupled to the primary winding of the ignition apparatus so as to receive impulses and give indications corresponding to the impulses delivered to the sparking plugs, and a variable resistance connected in a circuit shunted across the primary winding of the ignition apparatus for progressively reducing the intensity of the impulses delivered to the sparking plugs.

5. Apparatus for testing the ignition systems of internal combustion engines comprising a telephone receiver, means whereby the telephone receiver can be coupled to the secondary winding of the ignition apparatus so as to receive impulses and give indications corresponding to the impulses delivered to the sparking plugs, and means for progressively reducing the intensity of the latter impulses.

6. Apparatus for testing the ignition systems of internal combustion engines comprising a telephone receiver, means whereby the telephone receiver can be coupled to the secondary winding of the ignition apparatus so as to receive impulses and give indications corresponding to the impulses delivered to the sparking plugs, and a variable resistance connected in a circuit shunted across the sparking plug points for progressively reducing the intensity of the impulses delivered to the sparking plugs.

7. Apparatus for testing ignition systems of internal combustion engines comprising a transformer, an electrical indicating device coupled through the said transformer to the ignition apparatus so as to receive impulses and give indications corresponding to the impulses delivered to the sparking plugs, and means for progressively reducing the intensity of the latter impulses.

8. The combination with high tension ignition apparatus for internal combustion engines, of a telephone receiver coupled to the ignition system so as to receive impulses corresponding to those delivered to the sparking plugs, and a filter circuit including a condenser connected to the telephone receiver.

9. The combination with high tension ignition apparatus for internal combustion engines having a lead for an ignition switch from the ignition apparatus to the control panel, of a telephone receiver coupled to the primary winding of the ignition apparatus through such lead so as to receive impulses and give indications corresponding to the impulses delivered to the sparking plugs, and means for progressively reducing the intensity of the latter impulses.

10. Apparatus for testing the ignition systems of internal combustion engines employing spark ignition, comprising a circuit including a telephone receiver, a condenser and a resistance in series with one another, and means for connecting such circuit across the sparking plug points of the ignition system.

11. The combination with high tension ignition apparatus for internal combustion engines, of testing apparatus connected to the primary winding of the ignition system and including a high speed electrical indicating device adapted to receive impulses and give indications corresponding to the impulses delivered to the sparking plugs.

12. The combination with high tension ignition apparatus for internal combustion engines, of testing apparatus connected to the primary winding of the ignition apparatus and comprising a high speed electrical indicating device, adapted to receive impulses and gives indications corresponding to the impulses delivered to the sparking plugs, and means for progressively reducing the intensity of the latter impulses.

13. The combination with high tension ignition apparatus for internal combustion engines, of testing apparatus connected to the primary winding of the ignition apparatus and comprising high speed electrical indicating device, adapted to receive impulses and give indications corresponding to the impulses delivered to the sparking plugs, and a variable resistance in a circuit shunted across the primary winding of the ignition apparatus.

FRANK RAYMOND FABER RAMSAY.